United States Patent
Weber et al.

(10) Patent No.: US 10,047,811 B2
(45) Date of Patent: Aug. 14, 2018

(54) WHEEL WITH A WHEEL-MOUNTED BRAKE DISK

(71) Applicant: Siemens AG Oesterreich, Vienna (AT)

(72) Inventors: Franz-Josef Weber, Graz (AT); Ruediger Zenz, Graz (AT)

(73) Assignee: Siemens AG Österreich, Vienna (AT)

( * ) Notice: Subject to any disclaimer, the term of this patent is extended or adjusted under 35 U.S.C. 154(b) by 0 days.

(21) Appl. No.: 15/024,305

(22) PCT Filed: Aug. 13, 2014

(86) PCT No.: PCT/EP2014/067319
§ 371 (c)(1),
(2) Date: Mar. 23, 2016

(87) PCT Pub. No.: WO2015/043818
PCT Pub. Date: Apr. 2, 2015

(65) Prior Publication Data
US 2016/0238096 A1      Aug. 18, 2016

(30) Foreign Application Priority Data
Sep. 24, 2013   (AT) ............................. A 50615/2013

(51) Int. Cl.
*F16D 65/12*       (2006.01)
*F16D 65/847*      (2006.01)
(Continued)

(52) U.S. Cl.
CPC ......... *F16D 65/124* (2013.01); *F16D 65/847* (2013.01); *F16D 2065/138* (2013.01); *F16D 2065/1392* (2013.01); *F16D 2065/789* (2013.01)

(58) Field of Classification Search
CPC ............ F16D 65/124; F16D 2065/138; F16D 2065/1392; B60B 17/0006
(Continued)

(56) References Cited

U.S. PATENT DOCUMENTS 3,877,551 A     4/1975   Gebhardt et al.
5,010,985 A *   4/1991   Russell ................. F16D 65/124
                                                188/18 A
(Continued)

FOREIGN PATENT DOCUMENTS

CN    202461112    10/2012
CN    103562588    2/2014
(Continued)

OTHER PUBLICATIONS

EPO machine translation; EP 0062774 A1, Mar. 1982.*
Office Action dated Apr. 26, 2017 which issued in the corresponding Chinese Patent Application No. 201480052685.2.

*Primary Examiner* — Thomas J Williams
(74) *Attorney, Agent, or Firm* — Cozen O'Connor

(57) ABSTRACT

A rail wheel having a wheel-mounted brake disk fastened to the wheel body of the rail wheel by multiple fastening elements distributed across the wheel circumference and seated against the wheel body within this fastening region, where the wheel-mounted brake disk is seated against the wheel body in at least one radial area radially outside the fastening region in the cold state and is spaced apart from the wheel body in the region radially within the fastening region to reduce stress on the fastening elements after braking has been initiated.

13 Claims, 2 Drawing Sheets

(51) Int. Cl.
*F16D 65/02* (2006.01)
*F16D 65/78* (2006.01)

(58) Field of Classification Search
USPC .................................................. 188/218 XL
See application file for complete search history.

(56) References Cited

U.S. PATENT DOCUMENTS

| | | | | |
|---|---|---|---|---|
| 5,137,122 | A | * | 8/1992 | Watson ................. F16D 65/124 |
| | | | | 188/218 XL |
| 5,150,774 | A | * | 9/1992 | Adamson .............. F16D 65/124 |
| | | | | 188/218 XL |
| 5,788,026 | A | | 8/1998 | Poli |
| 2006/0021542 | A1 | * | 2/2006 | Bieker ................. B60B 17/0006 |
| | | | | 105/209 |
| 2014/0131152 | A1 | * | 5/2014 | Niessner ................... B61H 5/00 |
| | | | | 188/218 XL |

FOREIGN PATENT DOCUMENTS

| | | | | |
|---|---|---|---|---|
| DE | 2110515 | A1 | 9/1971 | |
| DE | 2047513 | A1 | 3/1972 | |
| DE | 2828109 | A1 | 1/1980 | |
| DE | 3935635 | A1 | 5/1991 | |
| DE | 68911250 | T2 | 4/1994 | |
| DE | 69102340 | T2 | 9/1994 | |
| DE | 69206500 | T2 | 5/1996 | |
| DE | 19709178 | B4 * | 10/2008 | ........... F16D 65/124 |
| DE | 202009014768 | U1 | 4/2011 | |
| EP | 0062774 | A1 | 10/1982 | |
| EP | 0159639 | B1 * | 3/1988 | ........... F16D 65/123 |
| GB | 2060096 | A * | 4/1981 | ............. B60B 17/00 |
| RU | 2184043 | | 6/2002 | |
| SU | 500743 | | 1/1976 | |
| WO | WO 2010108671 | A1 | 9/2010 | |
| WO | WO 2012160094 | A2 * | 11/2012 | ........... F16D 65/124 |

* cited by examiner

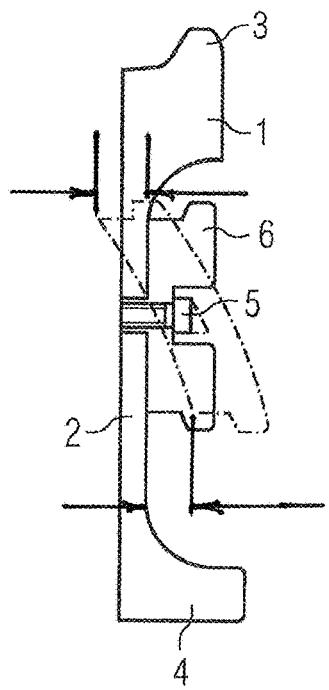
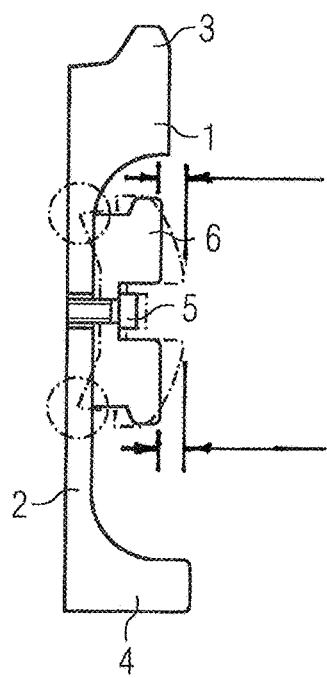

WHEEL WITH A WHEEL-MOUNTED BRAKE DISK

CROSS REFERENCE TO RELATED APPLICATIONS

This is a U.S. national stage of application No. PCT/EP2014/067319 filed Aug. 13, 2014. Priority is claimed on Austrian Application No. AT A50615/2013 filed Sep. 24, 2013, the content of which is incorporated herein by reference in its entirety.

BACKGROUND OF THE INVENTION

1. Field of the Invention

The invention relates to a rail wheel with a wheel-mounted brake disk, which by virtue of multiple fastening elements distributed across the wheel circumference is fastened to the wheel body of the rail wheel and is seated against the wheel body in this fastening region.

In this case, only one wheel-mounted brake disk may be provided on one side of the wheel, or two wheel-mounted brake disks may be provided, one on each side of the wheel. Multiple concentric wheel-mounted brake disks on one or on both sides of the wheel are also conceivable.

In rail vehicles, the wheel is usually designed as a monobloc wheel, i.e., as a disk wheel. In these vehicles, the wheel body comprises the wheel web and the wheel hub. However, the invention is not restricted to monobloc wheels.

2. Description of the Related Art

Rail vehicles generally utilize a plurality of braking systems, where a brake controller coordinates the interaction of all braking systems. In this case, the most important braking system is the friction brake. This converts the kinetic energy of a rail vehicle into heat using two friction partners. In this case of high-speed trains, the friction partners are brake disks made of steel and brake pads made of sintered metal.

Here, the brake disks can be embodied as wheel-mounted brake disks. The braking torque is transmitted from the wheel-mounted brake disk to the wheel via a force-locking connection, usually a screwed connection. During braking, a very high output is introduced into the wheel-mounted brake disk and the latter is as a result thermally deformed. The thermal deformation places great stress on the fastening elements which, where applicable, causes considerable loosening of the screwed connection, and may even result in the loss of the screw prestressing force. This results in the screwed connection coming undone or failing.

Hitherto, this problem was solved by seating the wheel-mounted brake disk with its cooling fins completely against the wheel body, more specifically the wheel web, and the screwed connection was designed such that despite the loosening the remaining screw prestressing force is sufficient to transmit the braking torque. Such arrangements are known from the introductory part of the description of DE 10 2008 003 923 A1, which itself in turn discloses a rail wheel in which a shim is provided in the contact region between wheel-mounted brake disk and wheel body.

Another possibility for ensuring sufficient screw prestressing is to connect the wheel-mounted brake disk for transmission of the braking torque additionally in form-lock manner to the wheel, so that a lesser amount of stress is placed on the screwed connections.

SUMMARY OF THE INVENTION

It is an object of the present invention to provide a rail wheel with a wheel-mounted brake disk, with which the stress on the fastening elements can be reduced after braking has been initiated, e.g., the screwed connection can be relieved of stress.

This and other objects and advantages are achieved in accordance with the invention by providing a rail wheel in which the wheel-mounted brake disk is seated against the wheel body in at least one radial region outside the fastening region in the cold state, and is spaced apart from the wheel body in the region radially within the fastening region, i.e., is not seated against the wheel body.

Provision can be made for the wheel-mounted brake disk to be seated directly against the wheel body in the cold state radially in at least one radial region outside the fastening region, in other words for no intermediate layer, for instance made of a different material, to be provided. It should be understood it is possible to also provide an intermediate layer.

The term "cold state" describes the fact that the wheel-mounted brake disk has an ambient temperature, i.e., approximately 0 to 30° C., i.e., is not heated by the braking and thermally deformed.

When the inventive rail wheel is thus in the cold, thermally non-deformed state, the wheel-mounted brake disk is seated against the wheel body in the fastening region and outside this fastening region also in another region, which is generally spaced apart from the fastening region. However, the wheel-mounted brake disk is not seated against the wheel body within the fastening region in any region. In this inner region, the wheel-mounted brake disk is thus spaced apart from the wheel body.

This spacing can come about firstly in that the wheel-mounted brake disk is thinner on the inside (on the side facing the rail wheel) radially within the fastening region than radially outside the fastening region. This is achieved for instance in that, during the manufacture of the brake disk, more material is removed on its inside within the fastening region (viewed in the axial direction) than outside the fastening region. The wheel-mounted brake disk thus has on its inside, i.e., radially within the fastening region, a ledge or a rebound (away from the rail wheel). The rail wheel itself (generally the wheel web) can be designed in the region of the rebound to be planar against it. This embodiment enables the wheel-mounted brake disks to be mounted with a ledge onto conventional planar rail wheels and thus enables existing rail wheels to be retrofitted with inventive wheel-mounted brake disks.

The spacing of the wheel-mounted brake disk can, however, also be produced so that the rail wheel has a rebound (ledge) radially within the fastening region on the side facing the wheel-mounted brake disk. The side of the wheel-mounted brake disk facing the rail wheel is then planar in this region, whereas the rail wheel (the wheel web located in this position) has a ledge.

It would also be conceivable for both the rail wheel (i.e., generally the wheel web) and the wheel-mounted brake disk to have a rebound radially within the fastening region on the sides facing one another.

Only after braking is initiated, when the wheel-mounted brake disk heats up and deforms, will the wheel-mounted brake disk also be seated against the wheel body in one or more radial regions within the fastening region in all comtemplated embodiments of the invention.

During braking the wheel-mounted brake disk typically heats up, depending on the material and duration of braking, to temperatures of between 400 and 800° C.

The spacing (measured in the axial direction) between the wheel-mounted brake disk and wheel body in the region radially within the fastening region is, in order to achieve the inventive effect, at least 1 mm, preferably 2 mm, in particular between 3 and 4 mm. This spacing clearly lies outside manufacturing tolerances, which are generally in the range of up to 0.5 mm. This spacing is identical across the entire circumference.

If the wheel-mounted brake disk has cooling fins, provision can be made for it to be seated against the wheel body with the cooling fins radially outside the fastening region, and (not until thermal deformation occurs) also in the region within the fastening region.

Cooling fins are created by longitudinal indentations in the wheel-mounted brake disk, which are aligned to the wheel body in the depth direction, in other words project out over the remaining plane of the wheel-mounted brake disk on the side of the wheel body. In the longitudinal direction, the cooling fins mostly extend radially.

Provision can be made, for instance, for design reasons or for reasons of the cooling effect, for the at least one radial region outside the fastening region, where the wheel-mounted brake disk is seated against the wheel body, to be spaced apart from the fastening region in the radial direction. However, in the same way the wheel-mounted brake disk could also (directly adjacent to the fastening region which in any case is seated against the wheel body) be seated against the wheel body directly radially outside the fastening region.

In the simplest case, the wheel-mounted brake disk has an integral and annular configuration, but it could also be composed of a plurality of annular segments.

Generally, the fastening elements will be screws which, for instance are arranged along a circle with its center in the wheel axle, which has the advantage that the connection can be undone. This would also be the case if the wheel-mounted brake disk is fixed to the wheel using springs and bolts. However, in principle the wheel-mounted brake disk could also be riveted or forged to the wheel.

With the present invention it is possible, by using the existing screwed connection, to increase the safety of the latter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention reference is made in the following part of the description to the figures, from which further advantageous embodiments, details and developments of the invention can be taken, in which:

FIG. 3 is a longitudinal sectional view through a wheel with a wheel-mounted brake disk spaced apart on the inside and outside; and FIG. 4 is a longitudinal sectional view through a wheel with a wheel-mounted brake disk without spacing.

DETAILED DESCRIPTION OF THE EXEMPLARY EMBODIMENTS

Figure 2:
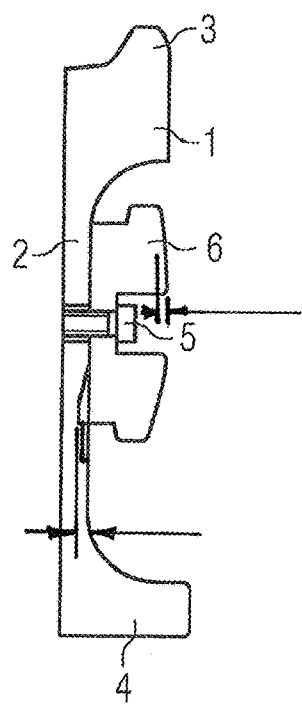
FIG. 2 is a longitudinal sectional view through wheel with a wheel-mounted brake disk aligned on the inside in accordance with the invention.

FIGS. 2 to 4 each show the top half of a wheel of a rail vehicle, with the wheel rim 1, the wheel flange 3 on the wheel rim, and the wheel web 2 which connects the wheel rim 1 to the wheel hub 4. Wheel web 2 and wheel hub 4 form the wheel body. Using screws 5, the annular wheel-mounted brake disk 6, which revolves around the wheel hub 4, is fastened to the wheel web 2.

Figure 1:
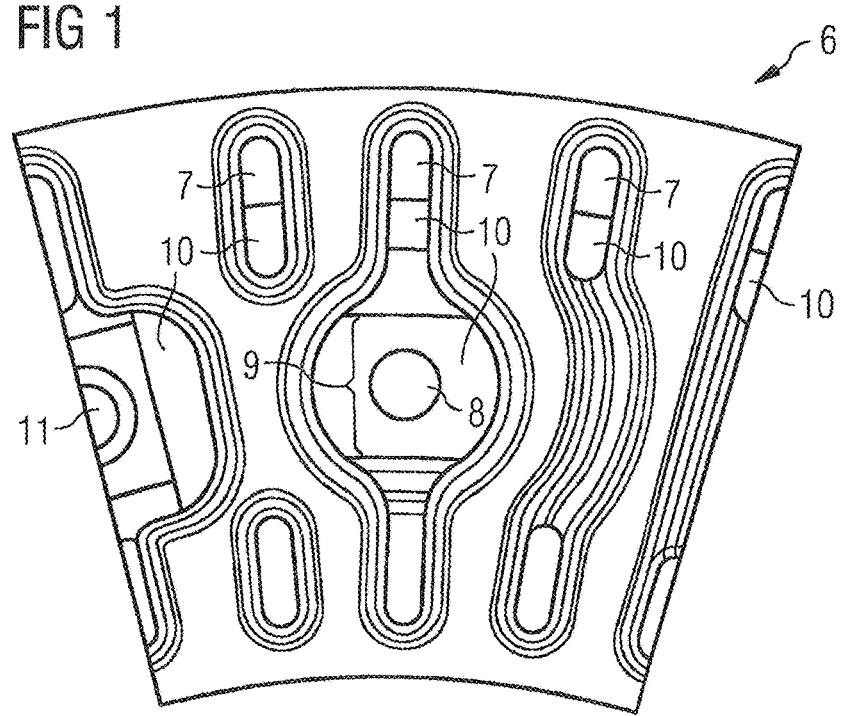
FIG. 1 is a sectional view of a wheel-mounted brake disk in accordance with the invention.

FIG. 1 depicts a cross-section of the wheel-mounted brake disk 6, i.e., the section continues annularly to the left and right. Different cooling fins 7 are apparent, in which the contact areas with the wheel web 2 are sketched in a dark color as contact areas 10. Only the fastening hole 8, into which the screw 5 is inserted, is embodied as a through-hole. Guide elements 11 are provided here between the fastening holes, and interact with corresponding counterpieces on the wheel web 2 to ensure radial guidance of the wheel-mounted brake disk 6 in the event of expansion caused by heating.

The annular region, in which all fastening holes 8 are located and which is likewise sketched using a dark color, represents the fastening region 9 at which the wheel-mounted brake disk in any case lies on the wheel web 2. FIG. 1 additionally shows another annular contact area 10 which is radially spaced apart from the fastening region 9, which is another contact area at which the wheel-mounted brake disk 6 with its cooling fins 7 is directly seated against the wheel web 2. In the region radially within the fastening region 9, i.e., in FIG. 1 underneath the fastening region 9, the cooling fins 7 do not touch the wheel web 2 when the wheel-mounted brake disk is cold and not thermally deformed.

In FIG. 3, which shows a longitudinal sectional view through a wheel with an inner and outer aligned wheel-mounted brake disk 6, this is depicted both in the cold state and in the thermally deformed state. The part of the wheel-mounted brake disk 6 located outside the fastening region 9 (depicted here above the screw 5) curves toward the wheel web 2, whereas the part (depicted here underneath the screw 5) arranged within the fastening region 9 moves away from the wheel web 2. The deformed state is greatly exaggerated, but the dimensioning arrows show that in this example the outer circumference of the wheel-mounted brake disk 6 migrates to the wheel web 2 to a relatively great extent, whereas the inner circumference migrates away from the wheel web 2 to a similarly great extent. This represents a lot of stress for the screw 5.

In FIG. 4, which shows a longitudinal section through a wheel with a wheel-mounted brake disk without spacing, this is likewise depicted both in the cold state and in the thermally deformed state. In the cold and new state, the wheel-mounted brake disk 6 is thus seated against the wheel web 2 both in the fastening region around the screws 5, and outside and inside thereof. The thermally deformed state is also greatly exaggerated here, but it is apparent that the free ends, i.e., the inner and the outer circumference of the wheel-mounted brake disk 6, cannot deform toward the wheel web 2, because they are already seated against it in the cold state. Therefore, the wheel-mounted brake disk 6 lifts up from the wheel web 2 in the fastening region 9 around the screws 5, i.e., in FIG. 4 directly above and underneath the screw 5, which puts stress on the screw connection. The wheel-mounted brake disk 6 (more precisely, the regions previously in contact with the wheel web 2 is then in this example located in the region that adjoins radially outside the screw 5, spaced axially apart from the wheel web 2, which corresponds to approximately a quarter of the spacing in FIG. 3, and in the region which adjoins radially inside the screw 5, spaced axially apart from the wheel web 2, which likewise corresponds to approximately a quarter of the spacing in FIG. 3.

In accordance with the inventive solution depicted in FIG. 2, the wheel-mounted brake disk 6 is only spaced apart on the inside in the cold state, i.e., it is seated against the wheel web in the fastening region 9 around the screws 5 and at least partially in the region outside the screws 5 or the fastening region 9, whereas with its free end, the inner circumference, it is axially spaced apart by for example, at least 1 mm from the wheel web 2. When the wheel-mounted brake disk 6 heats up, its free end can now move to the wheel web 2, which in this example equates to a change in the spacing by approximately a quarter of the extent from FIG. 3, whereas the wheel-mounted brake disk 6 lifts up from the wheel web 2 in the region directly radially outside the screws 5 by approximately one seventh of the extent from FIG. 3. In the region directly radially inside the screws 5, the contact between wheel-mounted brake disk 6 and wheel web 2 is maintained. The presently contemplated embodiment thus exerts the least stress on the screw 5. The wheel-mounted brake disk here has a thickness of approximately 25 mm, for example.

Experiments show that with the present disclosed embodiments of the invention (the spacing of the inner region of the wheel-mounted brake disk 6 or the inner cooling fins 7) not as much stress is placed on the screwed connection and/or the wheel-mounted brake disk 6 can absorb a higher braking power compared to the conventional solution shown, with no loss of safety.

The safety of this safety-related component is increased and the stress put on the screwed connection is reduced. A more economical screwed connection can be therefore used, with no loss of safety.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rail wheel comprising:
a wheel-mounted brake disk fastened to a wheel body of the rail wheel by a plurality of fastening elements distributed over the wheel circumference and seated against the wheel body in a fastening region delineating a region radially outside the fastening region and a region radially within the fastening region;
wherein in a cold state the wheel-mounted brake disk is seated against the wheel body in at least one region radially outside the fastening region and the wheel-mounted brake disk is thinner on a side facing the rail wheel radially within the fastening region than a side radially outside the fastening region to space the wheel-mounted brake disk apart from the wheel body in the entire region radially within the fastening region.

2. The rail wheel with wheel-mounted brake disk as claimed in claim 1, wherein the wheel-mounted brake disk is seated directly against the wheel body in the cold state radially outside the fastening region in the at least one region.

3. The rail wheel with wheel-mounted brake disk as claimed in claim 1, wherein the wheel-mounted brake disk has a ledge on a side facing the rail wheel radially within the fastening region.

4. The rail wheel with wheel-mounted brake disk as claimed in claim 2, wherein the wheel-mounted brake disk has a ledge on a side facing the rail wheel radially within the fastening region.

5. The rail wheel with wheel-mounted brake disk as claimed in claim 1, wherein the rail wheel has a ledge on a side facing the wheel-mounted brake disk radially within the fastening region.

6. The rail wheel with wheel-mounted brake disk as claimed in claim 2, wherein the rail wheel has a ledge on a side facing the wheel-mounted brake disk radially within the fastening region.

7. The rail wheel with wheel-mounted brake disk as claimed in claim 3, wherein the rail wheel has a ledge on a side facing the wheel-mounted brake disk radially within the fastening region.

8. The rail wheel with wheel-mounted brake disk as claimed in claim 1, wherein the spacing between the wheel mounted-brake disk and wheel body is at least 1 mm.

9. The rail wheel with wheel-mounted brake disk as claimed in claim 8, wherein the spacing between the wheel mounted-brake disk and wheel body is at least 2 mm.

10. The rail wheel with wheel-mounted brake disk as claimed in claim 1, wherein the spacing between the wheel mounted-brake disk and wheel body is between 3 mm and 4 mm.

11. The rail wheel with wheel-mounted brake disk as claimed in claim 1, wherein the wheel-mounted brake disk includes cooling fins and where applicable is seated against the wheel body with the cooling fins disposed radially outside the fastening region.

12. The rail wheel with wheel-mounted brake disk as claimed in claim 1, wherein the at least one region outside the fastening region, at which the wheel mounted-brake disk is seated against the wheel body, is spaced apart from the fastening region in the radial direction.

13. The rail wheel with wheel-mounted brake disk as claimed in claim 1, wherein the wheel-mounted brake disk has an integral and annular configuration.

* * * * *